United States Patent [19]
Lee

[11] Patent Number: 6,111,226
[45] Date of Patent: Aug. 29, 2000

[54] ELECTRIC OVEN

[76] Inventor: Wen-Ching Lee, No.214,3rd. Floor,Fu-Hsing North Road, Taipei City, Taiwan

[21] Appl. No.: 09/468,644

[22] Filed: Dec. 22, 1999

[51] Int. Cl.[7] .............................. A47J 37/06; F27D 11/00
[52] U.S. Cl. ..................... 219/393; 219/392; 219/396; 219/452.13; 219/472; 219/99; 219/339
[58] Field of Search ..................................... 219/385, 386, 219/392, 393, 395, 396, 452.13, 472, 474; 99/339, 340, 341, 357

[56] References Cited

U.S. PATENT DOCUMENTS

| Re. 22,176 | 9/1942 | Russell et al. | 219/474 |
|---|---|---|---|
| 1,542,330 | 6/1925 | Ball | 219/392 |
| 1,959,198 | 5/1934 | Conry | 219/452.13 |
| 2,258,144 | 10/1941 | Parr et al. | 219/452.12 |
| 2,664,490 | 12/1953 | Allgeyer | 99/339 |
| 2,738,723 | 3/1956 | Jennett | 99/339 |
| 3,610,885 | 10/1971 | Zingg | 99/339 |
| 3,947,657 | 3/1976 | Ershler | 99/339 |
| 4,442,762 | 4/1984 | Beller | 99/340 |
| 4,516,485 | 5/1985 | Miller | 99/339 |
| 4,641,015 | 2/1987 | Mayeur | 219/386 |
| 5,968,387 | 10/1999 | Guerrier et al. | 219/392 |

FOREIGN PATENT DOCUMENTS 2324712 12/1974 Germany .
609854 3/1979 Switzerland .

*Primary Examiner*—Joseph Pelham
*Attorney, Agent, or Firm*—Michael D. Bednarek; Shawpittman

[57] ABSTRACT

An electric oven includes a front door, upper and lower heating tubes mounted in the oven near a top and a bottom thereof, respectively, an oven rack fixed between the upper and the lower heating tubes, a grease drip tray removably fixed below the lower heating tubes for catching dropped grease drips, a frying pan fixed above the upper heating tubes, and a top lid that may be pivotally and upward turned open for access to the frying pan. The top lid is provided on an inner surface along outer edges thereof with a perpendicular and continuous flange, such that when the top lid is in a closed position, the flange tightly contacts with top edges of the frying pan to seal the same. The oven is further provided on two lateral inner wall surfaces with two sliding channels, so that the grease drip tray may be removed from its lower position in the oven to fix in and between the two sliding channels for catching grease drips dropped from the frying pan. The top lid sealing the frying pan enables food in the frying pan to quickly become done and thereby save a lot of heat energy.

3 Claims, 5 Drawing Sheets

ELECTRIC OVEN

BACKGROUND OF THE INVENTION

The present invention relates to an improved electric oven, and more particularly to an improved electric oven equipped with a frying pan that may be tightly closed with a top lid to avoid spattered oil or grease.

A frying pan provided in an electric oven is usually located on a top of the oven. Typically, the electric oven with a frying pan has a front door that may be pivotally and downward turned open, upper and lower heating tubes respectively mounted to upper and lower portions inside the oven, an oven rack disposed between the upper and the lower heating tubes, and a grease drip tray disposed below the oven rack to catch grease drips dropped from the oven rack. The frying pan transversely extends between two lateral walls of the oven to locate above the upper heating tubes. A user may use the frying pan to cook some food, such as fried sausages, poached eggs, etc.

The above-described electric oven with frying pan has the following disadvantages in use:

1. The frying pan is heated only by a part of heat rays emitted by the upper heating tubes because the lower heating tubes are too far away from the frying pan to effectively heat the latter. The frying pan is therefore poor in terms of cooking efficiency.

2. When the oven rack and the frying pan are used at the same time to cook food, a large part of the electric heat rays emitted by the upper and the lower heating tubes are absorbed by food on the oven rack. It is very possible food on the frying pan is half done while food on the oven rack has already well done.

3. When using the frying pan to cook food, boiled grease or oil tends to spatter and smudge the oven, and walls, furniture, floor, and other electric appliances close to the oven, and even an operator's clothes.

4. When using the oven rack alone to roast food, heat energy generated by the heating tubes and steam rising from the food would escape from the oven via gaps between the frying pan and the oven. The escaped heat and steam diffuses into air to result in useless temperature rise in surroundings and unnecessary waste of energy source. It is therefore tried by the inventor to develop an improved electric oven with frying pan to solve the above-mentioned problems.

SUMMARY OF THE INVENTION

A primary object of the present invention is to provide an improved electric oven having a top lid that tightly closes a frying pan provided in the electric oven at an upper part thereof, so that heat generated by heating tubes and steam rising from cooked food may be effectively held in the frying pan to simmer the food, enabling the food to be done more quickly at reduced heat energy consumption.

Another object of the present invention is to provide an improved electric oven having movable grease drip tray that may be positioned either in a lower portion of the oven below the lower heating tubes or in an upper portion of the oven below the upper heating tubes. When the grease drip tray is positioned below the upper heating tubes, a part of the electric heat rays reflect off the grease drip tray and project onto a bottom surface of the frying pan. The heat energy provided by the oven is therefore fully utilized and the frying pan has increased cooking efficiency.

To achieve the above and other objects, the electric oven of the present invention mainly includes a front door, upper and lower heating tubes mounted in the oven near a top and a bottom thereof, respectively, an oven rack fixed between the upper and the lower heating tubes, a grease drip tray removably fixed below the lower heating tube(s) for catching dropped grease drips, a frying pan fixed above the upper heating tube(s), and a top lid that may be pivotally and upward turned open for access to the frying pan. The top lid is provided on an inner surface along outer edges thereof with a perpendicular and continuous flange, such that when the top lid is in a closed position, the flange tightly contacts with top edges of the frying pan to seal the same. The oven is further provided on two lateral inner wall surfaces with two sliding channels, so that the grease drip tray may be removed from its lower position in the oven to fix in and between the two sliding channels for catching grease drips dropped from the frying pan. The top lid sealing the frying pan enables food in the frying pan to quickly become done and thereby save a lot of heat energy.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
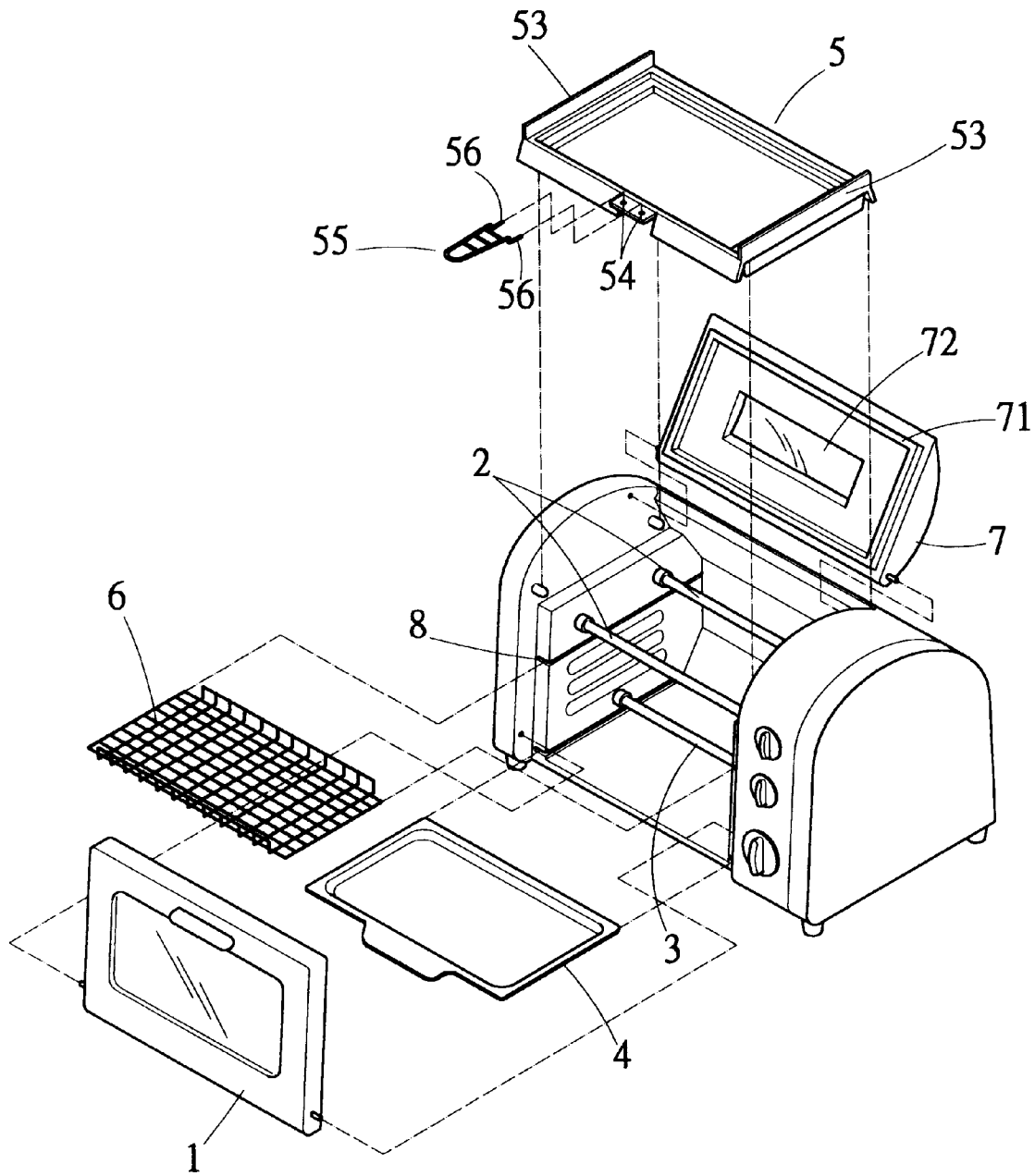
FIG. 1 is a partially exploded perspective of an electric oven according to the present invention.
Figure 2:
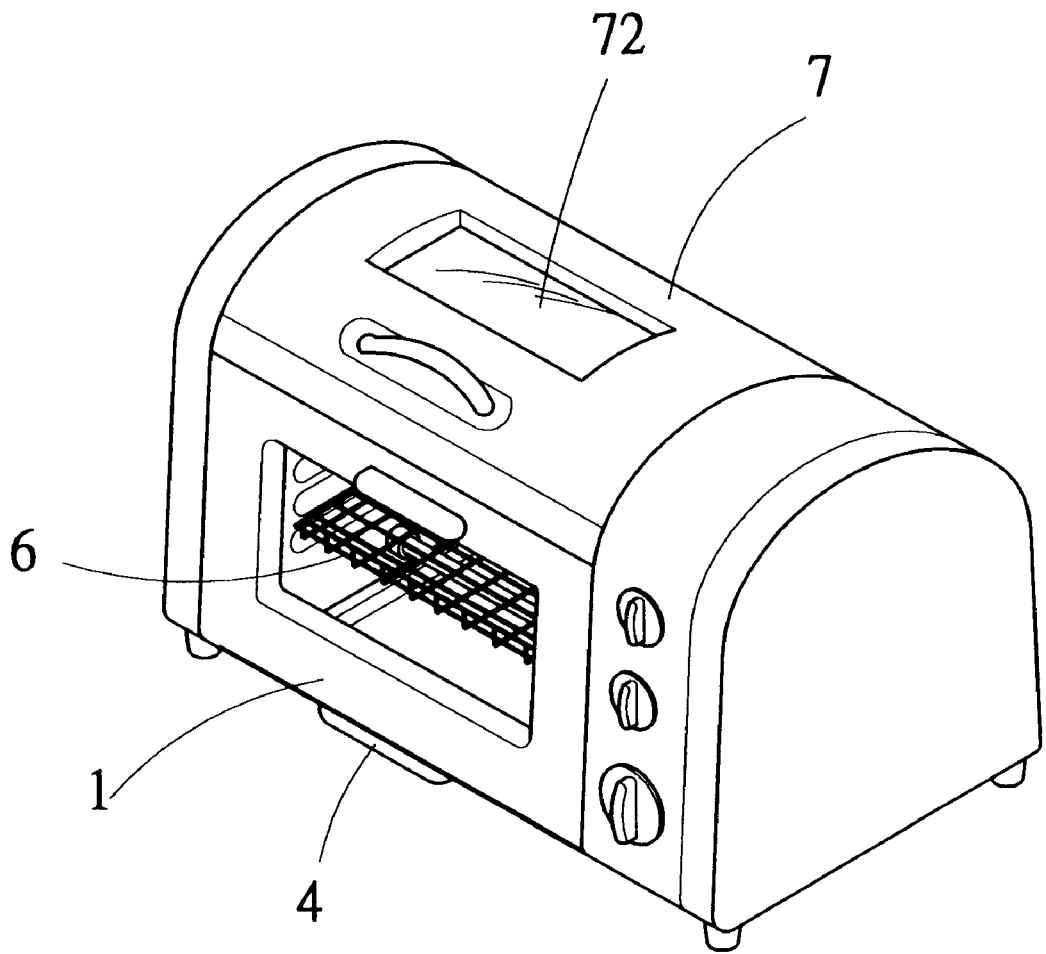
FIG. 2 is an assembled perspective of the electric oven of FIG. 1.

Please refer to FIGS. 1 and 2 that are partially exploded and fully assembled perspective views, respectively, of an electric oven according to the present invention. As shown, the electric oven includes a front door 1 that may be pivotally and downward turned open, upper and lower electric heating tubes 2 and 3 respectively provided in the oven near top and bottom thereof, a grease drip tray 4 normally fixed in the oven below the lower heating tube 3, a frying pan 5 provided in the oven above the upper heating tubes 2, an oven rack 6 provided in the oven between the upper and the lower heating tubes 2 and 3, and a top lid 7 that may be pivotally and upward turned open. The top lid 7 is provided on its bottom surface along outer edges thereof with a continuous and perpendicular flange 71 and has a central window 72. When the top lid 7 is in a closed position, the flange 71 tightly contacts with top edges 52 of the frying pan 5. The frying pan 5 is provided at two lateral sides with two upward and vertically extended walls 53. When the top lid 7 is in its closed position, the extended walls 53 fitly abut on two sides of the top lid 7 to enhance a tightly closed relation between the top lid 7 and the frying pan 5. The frying pan 5 is also provided at a front side near a central portion with insertion holes 54. A pair of tongs 55 having arms 56 corresponding to the insertion holes 54 may be used to safely remove a heated frying pan 5 from the oven by inserting the arms 56 into the holes 54. Two sliding channels 8 are provided on two lateral inner wall surfaces of the oven below the upper heating tubes 2, so that the grease drip tray 4 may be alternatively fixed below the upper heating tubes 2 by pushing it into the sliding channels 8.

Figure 3:
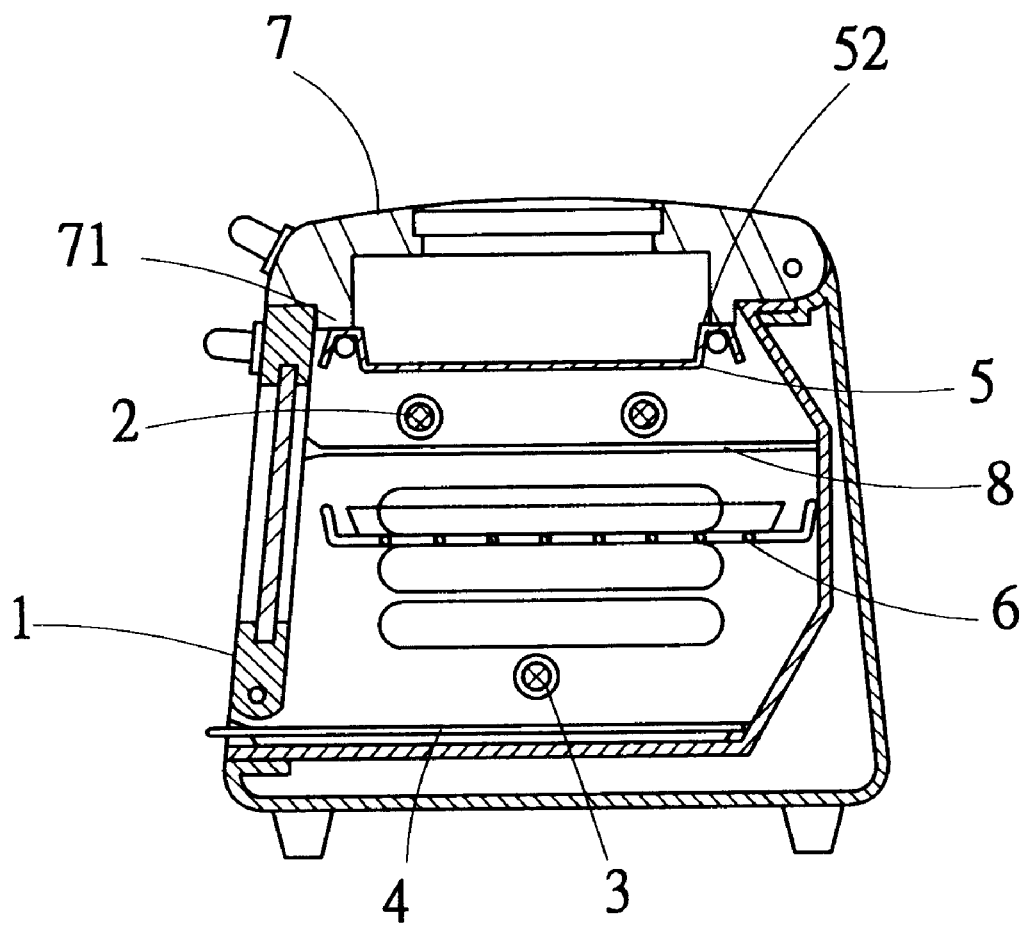
FIG. 3 is a sectional view of the oven of FIG. 1, wherein an oven rack fixed in a lower portion of the oven is in use.

Please now refer to FIG. 3 that is a sectional view of the electric oven of the present invention with the oven rack 6 being used to roast food. Of course, it is possible to use the frying pan 5 to broil food at the same time. When the oven is used in this manner, the grease drip tray 4 is positioned below the lower heating tube 3 as usual and the top lid 7 is in its closed position with the perpendicular flange 71 tightly contacting with top edges 52 of the frying pan 5. With the closed top lid 7, heat generated by the upper and the lower heating tubes 2 and 3 as well as steam rising from the roasted food can be held to circulate in the electric oven, including a space between the frying pan 5 and the top lid 7, food on the oven rack 6 and the frying pan 5 are therefore roasted and simmered at the same time and become done more quickly.

Figure 4:
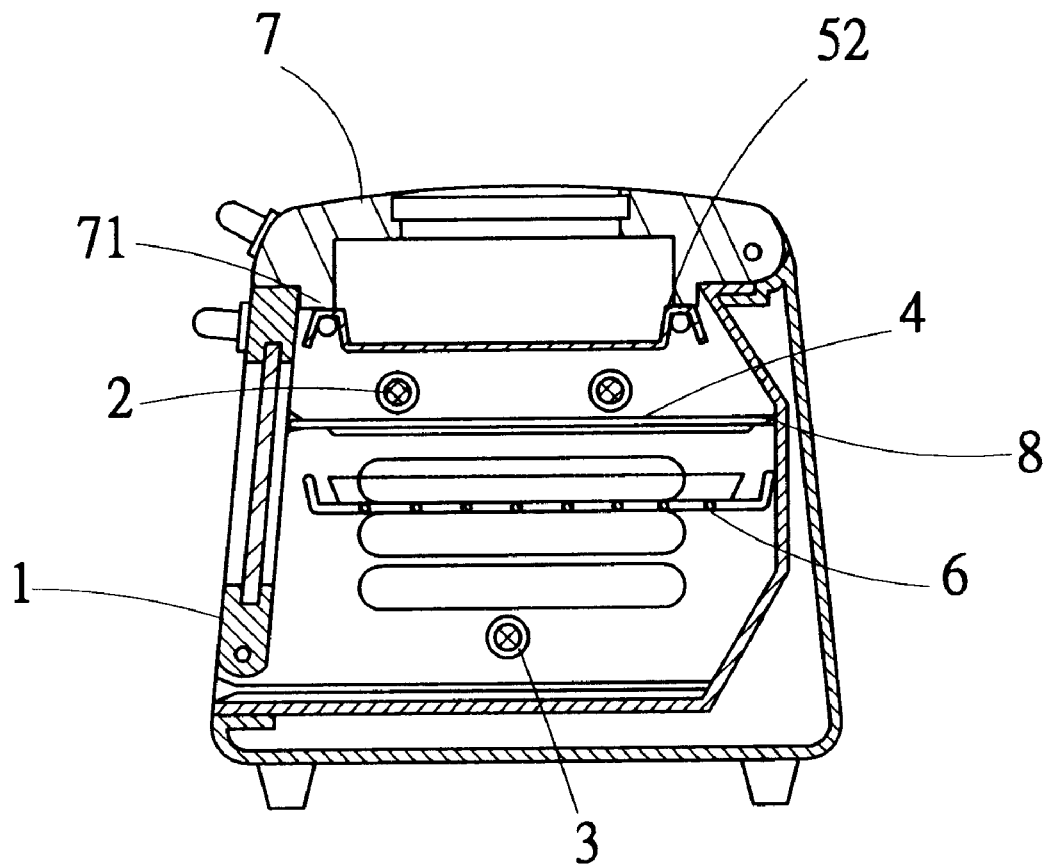
FIG. 4 is another sectional view of the oven of FIG. 1, wherein a frying pan fixed at an upper portion of the oven is in use.

FIG. 4 is another sectional view of the electric oven of the present invention in which only the frying pan 5 is used to cook food. When the electric oven of the present invention is used in this manner, the grease drip tray 4 is moved to locate in the sliding channels 8 below the upper heating tubes 2. By closing the top lid 7 to tightly contact the flange 71 with top edges 52 of the frying pan 5, heat generated by the heating tubes 2 and 3 and steam rising from the food being cooked is held and circulates in the oven, so that the cooked food is broiled and simmered at the same time and becomes done more quickly.

Furthermore, the positioning of the grease drip tray 4 below the upper heating tubes 2 effectively shortens a distance between the grease drip tray 4 and the upper heating tubes 2 and allows electric heat rays from the upper heating tubes 2 to fully reflect off the grease drip tray 4 to project onto a bottom surface of the frying pan 5. Therefore, most part of the electric heat rays from the upper tubes 2 may be fully utilized to enhance a cooking efficiency of the frying pan 5. Due to an effective utilization of the electric heating rays, the electric oven of the present invention can be used in an energy-saving manner.

Figure 5:
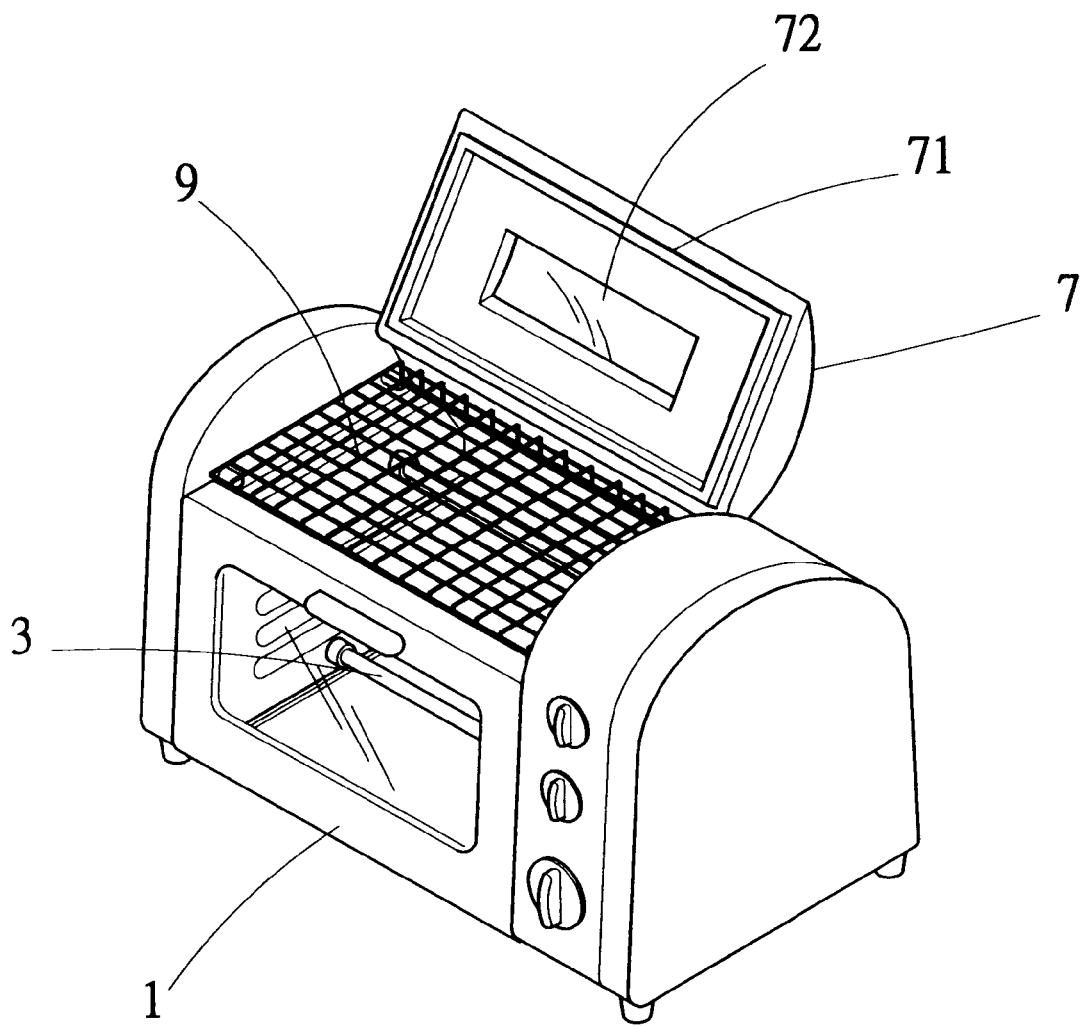
FIG. 5 is a perspective of the electric oven of FIG. 1 with the frying pan replaced by a grid.

The frying pan 5 could be alternatively replaced with a grid 9, as shown in FIG. 5, to provide another roasting space in the electric oven.

The following are some of the advantages of the present invention:

1. The top lid 7 tightly closes the frying pan 5 to effectively hold heat source and steam in the frying pan 5 to constantly simmer food therein, so that the food is quickly done with less energy consumption. The top lid 7 also prevents heated grease from spattering.

2. The grease drip tray 4 can be moved and then fixed below the upper heating tubes 2 to effectively shorten the distance between the grease drip tray 4 and the upper heating tubes 2, and thereby allow electric heat rays from the upper heating tubes 2 to fully reflect off the grease drip tray 4 and project onto the bottom surface of the frying pan 5. Therefore, most part of the electric heat rays from the upper tubes 2 can be fully utilized to enhance the cooking efficiency of the frying pan. A lot of energy can therefore be saved.

3. The frying pan 5 may be replaced with a grid 9 and the grease drip tray 4 fixed below the upper heating tubes 2 may be correspondingly used to catch any dropped grease drips to maintain a clean interior of the electric oven.

4. The heated frying pan 5 can be removed from the oven with the tongs 55 to avoid burning an operator's hand.

5. The top lid 7 prevents heat energy and steam inside the electric oven from escaping from the oven and diffusing into open air or combining with air outside the oven to result in useless rise of ambient temperature.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. An electric oven comprising a front door that may be pivotally and downward turned open for access to an interior of said oven, upper and lower heating tubes mounted in said oven near a top and a bottom thereof, respectively, an oven rack fixed between said upper and said lower heating tubes, a grease drip tray removably fixed below said lower heating tube for catching dropped grease drips, a frying pan fixed above said upper heating tubes, and a top lid that may be pivotally and upward turned open for access to said frying pan; said top lid being provided on an inner surface along outer edges thereof with a perpendicular and continuous flange, such that when said top lid is in a closed position, said flange tightly contacts with top edges of said frying pan to seal said frying pan, and said oven being provided on two lateral inner wall surfaces with two sliding channels, so that said grease drip tray may be removed from its lower position in said oven to fix in and between said two sliding channels for catching grease drips dropped from said frying pan.

2. An electric oven as claimed in claim 1, wherein said frying pan is provided at a front side with insertion holes into which two arms of a pair of tongs may be inserted to facilitate safe removal of said frying pan, having been heated, from said oven.

3. An electric oven as claimed in claim 1, wherein said frying pan may be selectively replaced with a grid.

* * * * *